United States Patent [19]

Francis

[11] 4,332,081
[45] Jun. 1, 1982

[54] TEMPERATURE SENSOR

[75] Inventor: Gaylord L. Francis, Califon, N.J.

[73] Assignee: North American Philips Corporation, New York, N.Y.

[21] Appl. No.: 168,842

[22] Filed: Jul. 10, 1980

Related U.S. Application Data

[62] Division of Ser. No. 917,977, Jun. 22, 1978, abandoned.

[51] Int. Cl.³ ............................................. H01C 7/02
[52] U.S. Cl. ................................. 29/612; 338/22 R; 338/25; 338/308; 374/3; 374/185
[58] Field of Search .......... 338/25, 195, 22 R, 22 SD, 338/260, 307–309, 319, 320; 73/362 AR; 29/610, 612, 613, 620, 626, 627, 611

[56] References Cited

U.S. PATENT DOCUMENTS

| | | | |
|---|---|---|---|
| 3,512,167 | 5/1970 | Weinstein | 73/362 AR |
| 3,548,661 | 12/1970 | Lilly, Jr. et al. | 73/362 AR |
| 3,673,117 | 6/1972 | Schroeder et al. | 338/308 X |
| 3,748,174 | 7/1973 | Chen et al. | 338/22 X |
| 4,006,278 | 2/1977 | Pukaite | 338/308 X |
| 4,041,440 | 8/1977 | Davis et al. | 338/195 |

*Primary Examiner*—Leon Gilden
*Attorney, Agent, or Firm*—James J. Cannon, Jr.

[57] ABSTRACT

A temperature sensor is constructed as a bridge circuit using thick film technology. Both thermistor and resistor thick film inks are applied to a substrate to form a bridge circuit for producing a highly sensitive and accurate indicator when a predetermined temperature has been reached. The resistor thick film circuit is laser scribed at a specific temperature value for greater accuracy.

1 Claim, 5 Drawing Figures

U.S. Patent  Jun. 1, 1982  Sheet 1 of 2  4,332,081
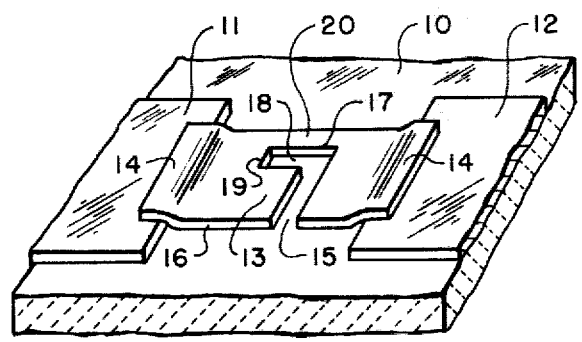
(PRIOR ART)
FIG_1
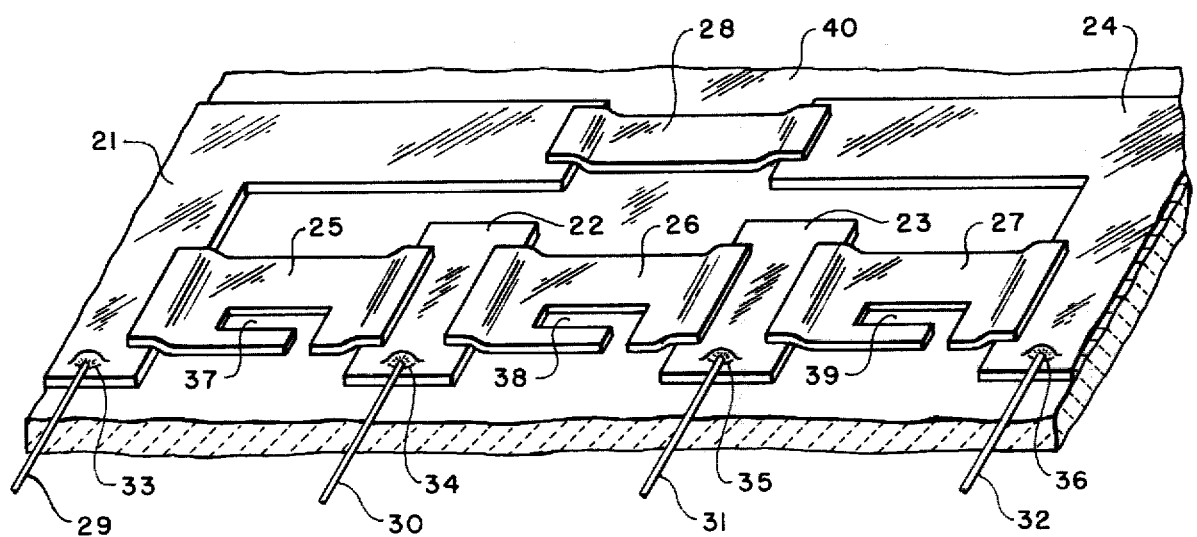
FIG_2

U.S. Patent   Jun. 1, 1982   Sheet 2 of 2   4,332,081
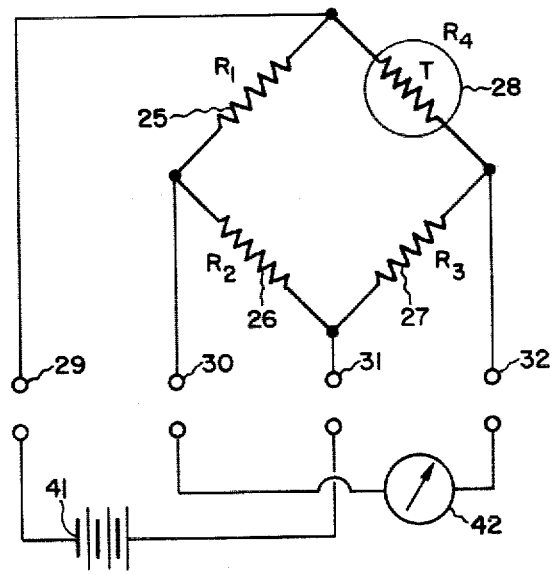
FIG_3
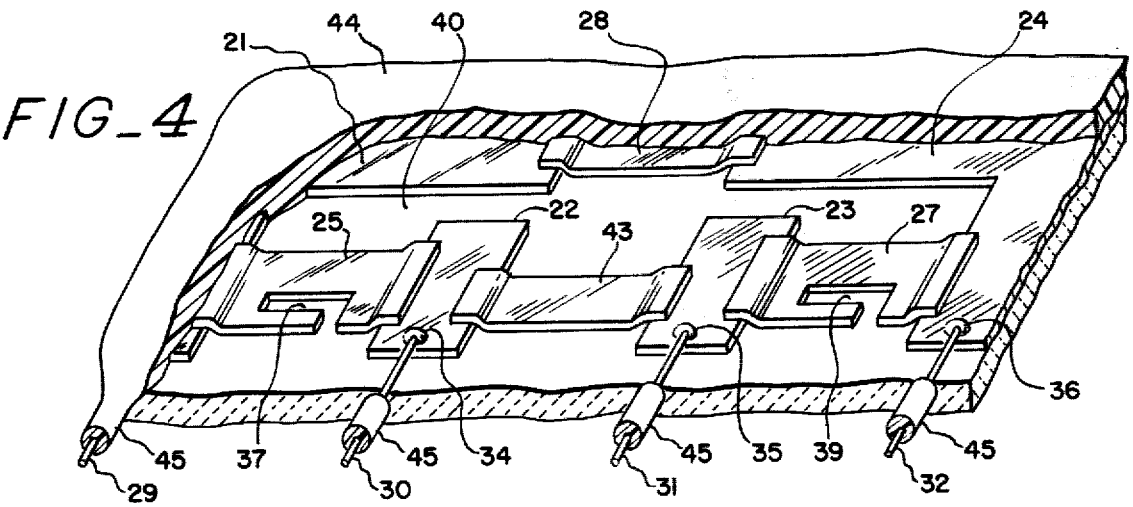
FIG_4
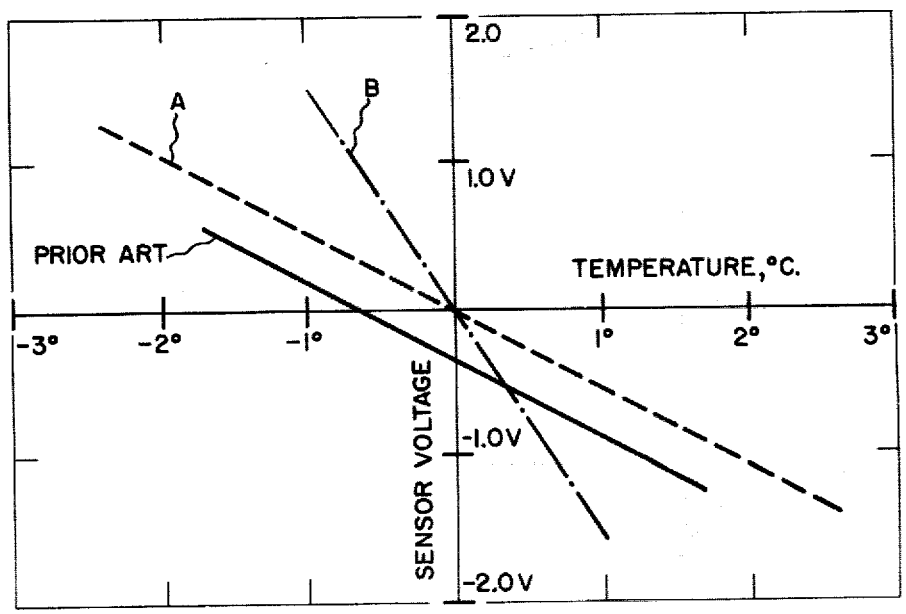
FIG_5

TEMPERATURE SENSOR

This is a division of application Ser. No. 917,977, filed June 22, 1978 now abandoned.

BACKGROUND OF THE INVENTION

The invention relates to temperature sensors, particularly those in which a change in resistance of a material is used as an indication of temperature.

There are a number of different types of resistive temperature sensors commercially available. These include thermocouples, thermistors, and resistance temperature detectors (RTD's). Thermocouples and RTD's are relatively expensive to manufacture and only have moderate sensitivity. Thermistors alone have high sensitivity, but are non-linear in response, only moderately accurate, have part-to-part variations, and therefore are not suitable for many applications.

Temperature sensors can also be constructed from thermistors by combining them together with discrete resistors in a bridge circuit. Such manufacturing procedure is expensive since the thermistors must be individually tested and matched with discrete resistors having specific resistance values. The resulting discrete circuit is not compact and does not have the mechanical and electrical reliability required for many applications. Prior to the present invention there has been no low cost, compact, highly accurate, reliable temperature sensor.

SUMMARY OF THE INVENTION

It is an object of the invention to provide a highly accurate temperature sensor.

It is another object of the invention to provide a bridge circuit including a thick film thermistor.

It is still another object of the invention to provide a temperature sensor which includes a resistive film containing a kerf defining the path of an electrical current.

It is yet another object of the invention to provide a resistive network in which resistive films having different temperature coefficients of resistance are provided on the same substrate.

The present invention provides a temperature sensor implemented on a substrate of an electrically insulating material. A plurality of conductive termination films are provided on and directly adhere to the substrate. A first resistive film material having a temperature coefficient of resistance (TCR) of less than 1000 ppm (parts per million) per degree centigrade is also provided on and directly adheres to the substrate, and extends between a first pair of termination films. A second resistive film material having a TCR of greater than 10,000 ppm/°C. is provided on and directly adheres to the substrate, and extends between a second pair of termination films different from the first pair.

The present invention is also concerned with a method of manufacturing a temperature sensor by screen printing two different types of resistive material films on a substrate. The temperature sensor is immersed in a liquid bath and a precise measurement of the resistance of the printed resistive material film is made at a predetermined precise temperature. The sensor is removed from the liquid, and at least one of the resistive films is trimmed by a laser to a particular value so that the temperature sensor is precisely calibrated to be responsive at the predetermined temperature.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIG. 1 is a perspective view of a laser-trimmed screened-on resistor known in the prior art;

FIG. 2 is a perspective view of a first embodiment of the temperature sensor according to the present invention;

FIG. 3 is a schematic diagram of the Wheatstone bridge circuit incorporated in the temperature sensor of FIG. 2;

FIG. 4 is a perspective view of a second embodiment of the temperature sensor according to the present invention; and FIG. 5 is a graph of the output voltage of the temperature sensor as a function of temperature according to the two embodiments of the present invention.

In the several Figures of the drawing, the same numerals represent like components of the invention.

DESCRIPTION OF THE PREFERRED EMBODIMENTS

FIG. 1 is a perspective view of a portion of a thick-film resistive device showing a single resistor which is laser trimmed to a precise value as is known in the prior art.

The device of FIG. 1 comprises a flat substrate 10 of an electrically insulating material. The substrate 10 is generally a ceramic material, such as glass, porcelain, steatite, barium titanate, berrylium oxide, alumina (Al$_2$O$_3$) or the like, and is typically 0.025 inch in thickness. On and directly adhering to the substrate 10 are at least two spaced termination films 11 and 12 composed of a conductive termination film material screen printed thereon. Such termination films typically extend as strips 0.10 inch in width along the surface of the substrate 10. The termination film material preferably is a metal film such as gold, copper, or other conductive metal, approximately 1 mil in thickness. A layer of resistive material forming a resistive film 13 extends between the two spaced terminations films 11 and 12. The resistive material layer is from 0.1 to 1.0 mils in thickness and overlaps a 10 mil portion 14 on each of the termination films 11 and 12.

Such thick film resistive devices are commonly formed by screen printing a resistive paste on the insulating substrate 10 and then firing the material to form the resistive film 13. The resistive paste is a complex mixture of glass, metal and semiconductive oxide particles suspended in an organic vehicle containing solvents, surfacants, and flow control agents. The particular combination of elements is chosen depending on the desired thixotropic and resistive properties of the material. After application to the substrate 10 by known screen printing methods, the entire substrate is fired to form the resistive film. The firing temperature for a typical resistive paste is from 800 to 900 degrees centigrade for 6 to 12 minutes. After printing, the resistive film 13 has an emulsion thickness of about 0.7 mils.

It is frequently necessary to adjust the resistance of the device by increasing the resistance of the film portion by trimming it to a predetermined resistance value by some means. Such trimming is performed by forming a kerf, that is a cut or ditch, across the electrical current path in the resistive film to make the effective width of the resistor smaller and thereby increase the resistance. The kerf may be formed by mechanical abrasion, chemical etching, or laser vaporization of the resistive material. Laser vaporization or trimming of the resistive material has significant advantages over mechanical or chemical trimming techniques which make it preferable for many applications. These advantages include higher production rates; greater flexibility in changing operational specifications; and the ability to achieve higher tolerences and greater precision.

FIG. 1 shows the kerf 15 vaporized on the resistor film 13 with a laser beam (not shown). The kerf 15 starts on one side 16 of the resistive film 13 and extends substantially perpendicular to the electrical current path between the termination films 11 and 12 to a point 17 in the resistive film 13. The kerf then reflexes parallel to the electrical current path and extends along the resistive film 13 for a predetermined distance 18 in the direction of the electrical current path until it terminates at a point 19 still in the resistive film 13. This type of kerf is known as an "L" cut and is used for the precise adjustment of the area 20 of the electrical current path. By first measuring the resistance of the untrimmed device, and then cutting the film with the kerf a predetermined amount of laser precisely adjusts the resistance of the device to that required.

FIG. 2 is a perspective view of a first embodiment of the temperature sensor as embodied in a bridge circuit using thick film technology according to the present invention. The circuit is shown as implemented on a flat substrate 40 of an electrically insulating material such as those found in the prior art. Although the substrate 40 is shown to be a flat body, it can be of any desired shape, such as tubular, solid cylindrical, or the like. The substrate is typically a 2" by 2½" flat rectangular substrate, 0.025" in thickness, and available from American Lava Corporation in Chatanooga, Tenn. Four spaced conductive termination films 21, 22, 23 and 24 are applied by screen printing on and directly adherent to the substrate 40. Four resistive pastes are then screen printed and fired on the substrate 40, forming resistive material films 25, 26, 27 and 28. The first resistive material film 25 is screen printed between termination films 21 and 22; the second resistive material film 26 is screen printed between termination films 22 and 23; the third resistive material film 27 is screened printed between termination films 23 and 24. Finally, the fourth resistive material film 28 is screen printed between termination films 21 and 24. Each of the resistive films 25, 26, 27 and 28 makes electrical contact with the corresponding termination films it is screen printed over, thereby forming a bridge circuit.

In the first embodiment, the first, second and third resistive material films 25, 26 and 27 are cermet films, and have a temperature coefficient of resistance (TCR) of less than 1000 parts per million (ppm) per degree centigrade. Typical examples of such cermet films are ruthenium oxide, irridium oxide, molybdenum trioxide or tungsten trioxide suspended in a glassy matrix for bonding to the substrate. The fourth resistive film 28 has a temperature coefficient of resistance (TCR) of greater than 10,000 ppm per degree centigrade, and may be referred to as a "thermistor" film. Typical examples of such a fourth resistive film are ruthenium oxide, and manganese oxide, and copper compounds in a glassy matrix containing materials such as zinc oxide, lead oxide, and silica, which are ground to pass a 325 mesh or smaller. The termination films 21, 22, 23 and 24 are typically palladium silver, platinum silver, or platinum gold compositions.

Although the circuit layout shown in FIG. 2 is preferred for implementing a temperature sensor, the principle of the present invention may be implemented with as few as two resistive films on and directly adherent to a substrate in a circuit, one film having a TCR of less than 1000 ppm per degree centigrade, and the other having a TCR of greater than 10,000 ppm per degree centigrade. The two films may even be electrically isolated. In that case, resistance of the two films may be independently measured, and a calculation performed using known parameters to determine the temperature. In another implementation, the two films may be electrically connected, such as by having a common termination, and measurements made at the other terminal end of the two resistive films.

Following the screen printing and firing of the four resistive films 25, 26, 27 and 28, the entire substrate 10 is immersed in a liquid bath (not shown) maintained at a precisely determined temperature. The temperature of the bath is selected as the exact temperature at which the temperature sensor under fabrication is to be responsive. The liquid may be any one of several non-conductive solvents known to those skilled in the art.

Four probes (not shown) are then applied to the conductive termination films 21, 22, 23 and 24 respectively, and a precise measurement of the resistance through each of the resistive films 25, 26, 27 and 28 is made. Such resistance values are then stored in a computer memory, and utilized by the laser trimming equipment for trimming one or more of the resistive films 25, 26 and 27 to a precise resistance value.

FIG. 2 shows kerfs 37, 38 and 39 vaporized on the resistive films 25, 26 and 27 respectively. Since the screen-printing film deposition process is subject to normal production variations, by laser trimming one or more of the resistive films 25, 26, 27 and 28 to a precisely determined value, the temperature sensor can be made highly accurate. It is generally preferred to laser trim the resistive film or films having a TCR of less than 1000 ppm per degree centigrade rather than the resistive film having a TCR of greater than 10,000 ppm per degree centigrade since laser trimming the latter to a value would be more difficult to adjust.

Finally, FIG. 2 also shows lead wires 29, 30, 31 and 32 connected to termination films 21, 22, 23 and 24 respectively. Such lead wires may be connected to the sensor by soldering, forming contacts 33, 34, 35 and 36 to the termination films 21, 22, 23 and 24 respectively.

In addition to soldering, the lead wires may be attached to the termination films by other bonding methods known to those skilled in the art. Following attachment of the lead wires, the entire sensor may be encapsulated in a water-tight coating, permitting use of the sensor in a liquid environment as will be explicitly shown in FIG. 4. The water-tight coating is not shown in the present Figure for simplicity.

The lead wires are also coated, and extend axially from the sensor body, further enabling the sensor to be immersed as a unit in a liquid environment, with the elongated coated lead wires connected to remotely located power and measurement circuitry.

FIG. 3 is a schematic diagram of the circuit implemented in the first embodiment of the temperature sensor shown in FIG. 2. Such a circuit is referred to as a Wheatstone bridge and is known in the prior art for the measurement of unknown resistances.

To use the circuit, an electrial potential, such as an electrical battery 41, of emf E, may be connected across terminals 29 and 31, and means for detecting current, such as a galvanometer 42, may be connected across terminals 30 and 32, as shown in FIG. 3. In actual application of the present invention, solid state current detection means would be preferred over the galvanometer 42. The galvanometer 42 is therefore illustrated in the Figure only for simplicity.

An analysis of the circuit by means of Ohm's laws and Kirchoff's laws (see, e.g., *Standard Handbook for Electrical Engineers*, D. G. Fink and J. M. Carroll, eds., McGraw-Hill, New York, 1968, pages 2–7) will indicate that no current will flow through the galvanometer if the condition $$R_1 R_3 = R_2 R_4$$

or $$\frac{R_1}{R_2} = \frac{R_4}{R_3}$$

is satisfied. In such a situation the bridge circuit is said to be "balanced." If the above condition is not satisfied, the circuit is unbalanced and a current proportional to $R_1 R_3 - R_2 R_4$ flows through the galvanometer.

In the circuit implementation of the first embodiment of the present invention, $R_1$, $R_2$, and $R_3$ are fixed resistors, and $R_4$ is a thermistor. The circuit is in balance at a predetermined, precisely determined temperature. By continuously monitoring the galvanometer, or other current measurement means, the user would be able to tell when the predetermined temperature has been reached, since at every other temperature there would be a net current flow.

Thus, the circuit will act as a temperature sensor to indicate if and when a precise temperature has been reached by indicating a null value.

In the first embodiment, the resistive films 25, 26 and 27 form the fixed resistor, and the film 28 forms the thermistor.

For greater sensitivity a second thermistor can be implemented in the circuit according to the present invention. FIG. 4 is a cut-away perspective view of a second embodiment of the temperature sensor according to the present invention including two thermistor resistive films implemented on the substrate. In FIG. 4, resistive films 25 and 27, the thermistor film 28 are implemented as in the first embodiment, and an additional thermistor film 43 is implemented between termination films 22 and 23 in place of a resistive film, forming a resistive network. A polyvinyl chloride (PVC) plastic coating 44, 45 surrounds and encapsulates the sensor of the present invention, enabling the device to be water-tight and used in a liquid environment.

The leads 29, 30, 31 and 32 are first preferably coated with a PVC coating 45, which will merge with the PVC coating 44 over the substrate, making the entire sensor-lead combination water-tight.

A PVC coated lead wire may also be configured as a ribbon (not shown), and attached to the substrate by soldering, like the discrete leads. Following the attachment of the coated leads, the sensor body (i.e., the substrate) is then encapsulated in the PVC coating 44 to a thickness of 0.005–0.02 mils by dipping the component in a PVC resin, and curing the resin for 4 minutes at a temperature of 205° C.

A PVC coating is preferred because during fabrication, the PVC coating on the leads melts into the coating of the sensor body, thereby forming a water tight seal of the entire component. The use of epoxy or other sealants is not desirable for the present application in a liquid since the epoxy may chip or crack, possibly exposing lead wires and causing a short.

The advantage in sensitivity of a two thermistor film implementation of FIG. 4 can be demonstrated from the circuit equations noted above. The current measured across terminals 30 and 32 is proportional to $R_1 R_3 - R_2 R_4$. In the second embodiment shown in FIG. 4, $R_2$ and $R_4$ are thermistors, and thus the current flow function is second order in the resistance of the thermistor. Since the resistance of the thermistor changes more rapidly with temperature than a fixed resistor, the value of the current flow approaches the null point (or threshold level around the null point) faster as a function of $T^2$, compared to RT, where R is the resistance of the fixed resistor, and T is the resistance of the termistor, at a given temperature.

FIG. 5 is a graph of the output voltage of the temperature sensor as a function of temperature in the prior art and in the two embodiments of the present invention.

Although the temperature sensor in actual use would typically operate on the basis of current changes, for test purposes it is easy to measure voltages, and thus the presentation in FIG. 5 is presented in terms of voltage/-temperature graphs. Since the location of the null point at which both voltage and current is zero is identical, and since such location is the critical feature for comparison purposes, the use of voltage measurements for comparison with the prior art is justified. The vertical axis represents the output voltage across terminals 30 and 32 when an input voltage of 8 volts is applied to terminals 29 and 31 of the sensor of FIGS. 2 and 4. The horizontal axis represents the ambient temperature at which the output voltage of the temperature sensor is measured. In this example, the temperature sensor is expected to be operative at 0° C.

The graph of the function denoted by the solid line labelled "prior art" in FIG. 5 represents the behavior of a typical temperature sensor constructed from discrete components in a bridge circuit such as shown in FIG. 3. The prior art graph illustrates one significant disadvantage: the null condition (0 volts) does not occur exactly at 0° C., the predetermined sensor operating temperature. This is a consequence of the fact that the thermistors and resistors have not been accurately matched; moreover, any matching which did take place was done at room temperature (25° C.), and not at the temperature at which the sensor was intended to be operative (0° C.).

The graph of the function denoted by the dashed line labelled A in FIG. 5 represents the behavior of the temperature sensor constructed according to the first embodiment of the present invention illustrated in FIG. 2. The graph of function A has essentially the same slope as the prior art graph since it is based upon the same bridge circuit shown in FIG. 3. However, the graph of function A does pass through the X-axis at exactly 0° C., this indicating that it is a more accurate and precise sensor than the prior art sensor.

The graph of the function denoted by the dot-and-dash line labelled B in FIG. 5 represents the behavior of the temperature sensor constructed according to the second embodiment of the present invention illustrated in FIG. 4. The graph of function B has a greater slope than the other two graphs since it is based upon a different, more sensitive, circuit. It is noted that the graph of function B also passes through the x-axis at exactly 0° C., thus indicating that the sensor of FIG. 4 is also a more accurate and precise sensor than the prior art sensor.

While the invention has illustrated and described as embodied as a thick film temperature sensor incorporating thermistor and resistive films, it is not intended to be limited to the details shown, since various modifications and structural changes may be made without departing in any way from the spirit of the present invention.

For example, the invention may be incorporated in a resistive network in which resistive films having different temperature coefficients of resistance are provided on a single substrate, and the sensor may be made responsive to a plurality of different predetermined temperatures.

I claim:

1. A method of adjusting the resistance of a temperature sensor comprising:

printing a plurality of first resistive material films, at least one second resistive material film forming a thermistor and a plurality of conductive termination films on the surface of a non-conductive substrate in a partially overlapping pattern to provide an electrical network;

firing said substrate to bond said films to said substrate and fix their properties;

immersing said substrate having said fired, formed films in a liquid bath maintained at a precise temperature, said temperature being the exact temperature at which said temperature sensor is to be responsive;

measuring the resistance through each of said resistive films while said films are in said bath;

removing said substrate from said bath;

trimming the resistance of at least one of said first resistive films to a precise resistance value.

* * * * *